US009459616B2

(12) United States Patent
Gray et al.

(10) Patent No.: US 9,459,616 B2
(45) Date of Patent: Oct. 4, 2016

(54) UNIVERSAL CONVERSATIONAL PROGRAMMING FOR MACHINE TOOL SYSTEMS

(75) Inventors: Paul J. Gray, Zionsville, IN (US); Karl Szabo, Fishers, IN (US)

(73) Assignee: Hurco Companies, Inc., Indianapolis, IN (US)

( * ) Notice: Subject to any disclaimer, the term of this patent is extended or adjusted under 35 U.S.C. 154(b) by 1672 days.

(21) Appl. No.: 12/765,352

(22) Filed: Apr. 22, 2010

(65) Prior Publication Data

US 2010/0274381 A1 Oct. 28, 2010

Related U.S. Application Data

(60) Provisional application No. 61/171,827, filed on Apr. 22, 2009.

(51) Int. Cl.
*G05B 19/409* (2006.01)
*G05B 19/4097* (2006.01)

(52) U.S. Cl.
CPC . *G05B 19/4097* (2013.01); *G05B 2219/35097* (2013.01); *G05B 2219/35098* (2013.01)

(58) Field of Classification Search
CPC .................................................. G05B 19/409
USPC ........... 700/181, 194, 159, 192, 182; 409/80
See application file for complete search history.

(56) References Cited

U.S. PATENT DOCUMENTS

| | | | |
|---|---|---|---|
| 4,131,836 A | 12/1978 | Noda | |
| 4,138,718 A | 2/1979 | Toke et al. | |
| 4,281,379 A | 7/1981 | Austin | |
| 4,489,377 A | 12/1984 | Mawyer et al. | |
| 4,794,514 A | 12/1988 | Hideaki et al. | |

(Continued)

FOREIGN PATENT DOCUMENTS

| | | |
|---|---|---|
| EP | 0 328 666 A1 | 8/1989 |
| EP | 0 519 077 A1 | 12/1992 |

(Continued)

OTHER PUBLICATIONS

Krovi, Venkat, Kumar, Vijay, Ananthasuresh, G.K., and Vezien, Jean-Marc, "Design and Virtual Prototyping of Rehabilitation Aids," ASME Journal of Mechanical Design, vol. 121, No. 3, pp. 456-458, Sep. 1999.

(Continued)

*Primary Examiner* — Tejal Gami
(74) *Attorney, Agent, or Firm* — Faegre Baker Daniels LLP

(57) ABSTRACT

A method is disclosed for controlling movement of machine tool systems by providing a conversational programming interface that permits a user to create a universal program for execution by various machine tool systems for machining a part, each system having at least four movable axes. The user defines program blocks including geometry definitions which are independent of any axis kinematics configuration. A first tool path relative to a first Cartesian coordinate system is generated for forming the geometry, then mapped to a second Cartesian coordinate system corresponding to the part. The mapped path is transformed to a third Cartesian coordinate system corresponding to an orientation and location of the part relative to an axis kinematics configuration of a current machine tool system. The transformed path is processed to generate positions for the movable axes of the current system.

24 Claims, 13 Drawing Sheets

(56) References Cited

U.S. PATENT DOCUMENTS

| | | |
|---|---|---|
| 5,248,924 A | 9/1993 | Niwa |
| 5,368,539 A | 11/1994 | Mills et al. |
| 5,400,259 A | 3/1995 | Murphy et al. |
| 5,417,130 A | 5/1995 | Dorsch |
| 5,453,933 A * | 9/1995 | Wright et al. ............. 700/181 |
| 5,611,032 A | 3/1997 | Matsuura et al. |
| 5,691,909 A | 11/1997 | Frey et al. |
| 5,735,513 A | 4/1998 | Toffolon |
| 6,019,554 A | 2/2000 | Hong |
| 6,022,132 A | 2/2000 | Schulz |
| 6,356,800 B1 | 3/2002 | Monz et al. |
| 6,445,959 B1 | 9/2002 | Poth |
| 6,445,964 B1 | 9/2002 | White et al. |
| 6,502,002 B2 | 12/2002 | Susnjara et al. |
| 6,745,098 B2 | 6/2004 | Belanger |
| 6,949,055 B2 | 9/2005 | Ferrari et al. |
| 6,999,841 B1 | 2/2006 | Rutkowski |
| 7,117,056 B2 | 10/2006 | Balic |
| 7,127,322 B2 | 10/2006 | Kreidler et al. |
| 7,440,874 B2 | 10/2008 | Durney et al. |
| 7,590,458 B2 | 9/2009 | Endo et al. |
| 7,684,891 B2 | 3/2010 | Okrongli et al. |
| 2003/0195642 A1 | 10/2003 | Ragnini |
| 2004/0128016 A1 | 7/2004 | Stewart |
| 2007/0061037 A1 | 3/2007 | Grossmann et al. |
| 2007/0191982 A1 | 8/2007 | Sullivan |
| 2008/0033591 A1 | 2/2008 | Lankalapalli et al. |
| 2008/0058982 A1* | 3/2008 | Gray ........................... 700/159 |
| 2008/0058984 A1* | 3/2008 | Gray et al. .................. 700/192 |
| 2008/0091394 A1 | 4/2008 | Hahn et al. |
| 2009/0271026 A1 | 10/2009 | Lerisson et al. |
| 2009/0312858 A1 | 12/2009 | Alpay et al. |
| 2010/0023156 A1 | 1/2010 | Trepina et al. |
| 2010/0031487 A1 | 2/2010 | Messina et al. |

FOREIGN PATENT DOCUMENTS

| | | |
|---|---|---|
| EP | 1 528 454 A2 | 5/2005 |
| JP | 3037703 A | 2/1991 |
| JP | 2003316405 | 11/2003 |
| WO | WO 2004/025400 A2 | 3/2004 |
| WO | WO 2009/037066 A1 | 3/2009 |
| WO | WO 2010/003882 A2 | 1/2010 |

OTHER PUBLICATIONS

Luo, Y.B., Ong, S.K., Chen, D.F., and Nee, A.Y.C., "An Internet-enabled image- and model-based virtual machining system," Int. J. Prod. Res., vol. 40, No. 10, pp. 2269-2288, 2002.

Xu, X.W., Wang, H., Mao, J., Newman, S.T., Kramer, T.R., Proctor, F.M., and Michaloski, J.L., "STEP-compliant NC research: the search for intelligent CAD/CAPP/CAM/CNC integration," Int. J. Prod. Res., vol. 43, No. 17, pp. 3703-3743, Sep. 1, 2005.

Yusof, Yusri, Newman, Stephen, Nassehi, Aydin, and Case, Keith, "Interoperable CNC System for Turning Operations," World Academy of Science, Engineering and Technology, vol. 49, pp. 928-934, 2009.

Roth, D., Ismail, F., and Bedi, S., "Mechanistic modelling of 5-axis milling using an adaptive depth buffer," pp. 1-40, 2003.

* cited by examiner

Rotary Block Menu

Universal Rotary Transform Plane -
Angle Input

Universal Rotary Transform Plane -
Vector Input

Universal Rotary Parameters block

Cylinder Mapping Transformation

Press Rotary BC transform

Universal Rotary Mirror Pattern

Convert feature to Cylindrical Feature

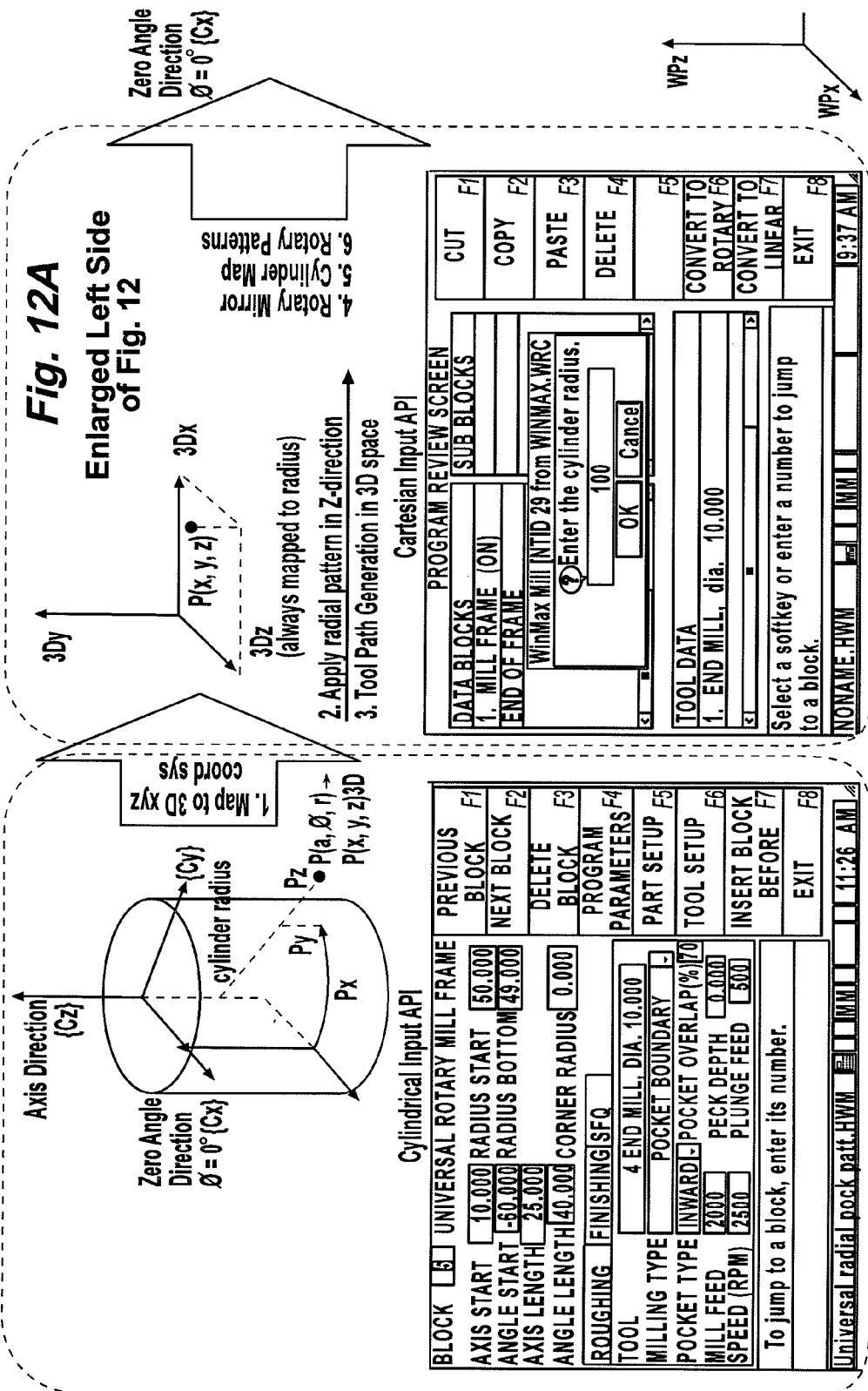

Enlarged Right Side of Fig. 12

US 9,459,616 B2

UNIVERSAL CONVERSATIONAL PROGRAMMING FOR MACHINE TOOL SYSTEMS

CROSS REFERENCE TO RELATED APPLICATIONS

This application is based on and claims priority to U.S. Provisional Application Ser. No. 61/171,963, filed Apr. 23, 2009, titled "UNIVERSAL CONVERSATIONAL PROGRAMMING FOR MACHINE TOOL SYSTEMS," and U.S. Provisional Application Ser. No. 61/171,827, filed Apr. 22, 2009, titled "UNIVERSAL CONVERSATIONAL PROGRAMMING FOR MACHINE TOOL SYSTEMS," the entire disclosures of which are expressly incorporated herein by reference.

This application is related to U.S. patent application Ser. No. 11/833,971, filed Aug. 3, 2007, titled "GENERALIZED KINEMATICS SYSTEM", (hereinafter, "the '971 Application"), U.S. Provisional Application Ser. No. 61/171,794, filed Apr. 22, 2009, titled "MULTI-ZONE MACHINE TOOL SYSTEM", U.S. Provisional Application Ser. No. 61/172,066, filed Apr. 23, 2009, titled "MULTI-ZONE MACHINE TOOL SYSTEM", U.S. Provisional Application Ser. No. 61/171,839, filed Apr. 22, 2009, titled "VIRTUAL MACHINE MANAGER", and U.S. Patent Application Ser. No. 61/172,044, filed Apr. 23, 2009, titled "VIRTUAL MACHINE MANAGER", the disclosures of which are expressly incorporated by reference herein.

FIELD OF THE DISCLOSURE

The present disclosure relates generally to interface and control methods for machine tool systems, and more particularly to methods and apparatuses for generating and executing universal programs for forming parts on a machine tool system having at least four moveable axes.

BACKGROUND AND SUMMARY

Conventional methods for generating and executing instructions for machining parts on a machine tool system having at least four moveable axes are written as an NC program expressed in a standard G&M code language, or a close derivative of this language based on either the International Standards Organization (ISO) or the Electronics Industries Association (EIA) RS-274-D, using codes identified by letters such as G, M, and F. The codes define a sequence of machining operations to control motion of the machine tool in the manufacture of a part, but may be unwieldy for complex operations.

Hurco Companies, Inc., the assignee of the present application, has offered another technique employing a conversational style programming suite whereby a machine tool operator is able to program a machine tool mill or lathe system to perform various operations through a graphical user interface. The conversational style programming suite provides a feature based approach that allows an operator to define the geometry of a part. An exemplary software package and user interface is the WINMAX brand system available from Hurco Companies, Inc. One exemplary conversational programming system is disclosed in U.S. Pat. No. 5,453,933, the disclosure of which is expressly incorporated by reference herein. Such conversational programming techniques, however, do not generate part programs for machining operations that require four or more movable axes that are independent of machine kinematics. As such, part programs written for execution by one machine tool system must be modified to be executed on another machine tool system with different kinematics. This is inconvenient, expensive, and provides additional opportunities for human error.

The present disclosure provides a conversational method and apparatus for generating and executing universal part programs for forming parts on any machine tool system having at least four movable axes, regardless of the machine kinematics.

In one embodiment of the disclosure, a method is provided for controlling movement of a machine tool system having defined kinematics including at least four movable axes to machine a part. The method includes the steps of providing a conversational programming interface configured to receive user input defining, without reference to the defined kinematics, a geometry to be formed on the part, generating a first tool path relative to the current coordinate system for forming the geometry, transforming the first tool path into a final tool path defined relative to a workpiece coordinate system, the workpiece coordinate system being a Cartesian coordinate system corresponding to an orientation and location of the part within the machine tool system, and processing the final tool path to generate positions for the at least four movable axes based on the defined kinematics.

In another embodiment of the disclosure, a method is provided for controlling movement of machine tool systems. The method includes the steps of providing a conversational programming interface that permits a user to create a program for execution by any of a plurality of machine tool systems for machining a part, each system having at least four movable axes and a corresponding axis kinematics configuration, receiving, using the interface, a block of the program including a definition of a geometry of the part, the geometry requiring use of at least one of a rotary axis and a tilt axis and being defined without reference to any axis kinematics configuration, generating a first tool path relative to a first Cartesian coordinate system for forming the geometry, mapping the first tool path to a second Cartesian coordinate system corresponding to the part, transforming the mapped tool path to a third Cartesian coordinate system corresponding to an orientation and a location of the part relative to an axis kinematics configuration of a current machine tool system, and processing the transformed tool path to generate positions for the at least four movable axes of the current machine tool system based on the axis kinematics configuration of the current machine tool system.

In another embodiment of the disclosure, a computer readable medium is provided having stored thereon instructions for generating a conversational programming interface on a display to enable a user to create a part program for execution by any of a plurality of machine tool systems having at least four movable axes and a corresponding axis kinematics configuration, instructions for receiving, using the interface, a block of the part program including a definition of a geometry of a part, the geometry requiring use of at least one of a rotary axis and a tilt axis and being defined without reference to any axis kinematics configuration, instructions for generating a first tool path relative to a first Cartesian coordinate system for forming the geometry, instructions for mapping the first tool path to a second Cartesian coordinate system corresponding to the part, instructions for transforming the mapped tool path to a third Cartesian coordinate system corresponding to an orientation and a location of the part relative to an axis kinematics configuration of a current machine tool system, and instructions for processing the transformed tool path to generate positions for the at least four movable axes of the current machine tool system based on the axis kinematics configuration of the current machine tool system.

In yet another embodiment of the disclosure, an apparatus for machining a part with at least one tool is provided. The apparatus includes a frame, a moveable support supported by and moveable relative to the frame, the moveable support supporting the part, a machine tool spindle supported by the frame and moveable relative to the part, the machine tool spindle adapted to couple the at least one tool, the moveable support and the machine tool spindle including at least four moveable axes and a corresponding axis kinematics configuration, a controller operably coupled to the machine tool spindle and the moveable support, the controller executing the machining of the part through the controlled movement of the plurality of moveable axes of the machine tool spindle and the moveable support, means for generating a conversational programming interface on a display that permits a user to create a part program that defines a geometry of the part without reference to the axis kinematics configuration, means for generating a first tool path relative to a first Cartesian coordinate system for forming the geometry, means for mapping the first tool path to a second Cartesian coordinate system corresponding to the part, and means for transforming the mapped tool path to a third Cartesian coordinate system corresponding to an orientation and a location of the part relative to the axis kinematics configuration, wherein the controller processes the transformed tool path to generate positions for the at least four movable axes based on the axis kinematics configuration.

BRIEF DESCRIPTION OF THE DRAWINGS

The above-mentioned aspects of the present teachings and the manner of obtaining them will become more apparent and the teachings will be better understood by reference to the following description of the embodiments taken in conjunction with the accompanying drawings, wherein:

FIGS. 12A and 12B are conceptual flow diagrams depicting various steps in a transformation sequence according to the present disclosure.

Corresponding reference characters indicate corresponding parts throughout the several views.

DETAILED DESCRIPTION OF THE DRAWINGS

The embodiments disclosed herein are not intended to be exhaustive or limit the invention to the precise form disclosed in the following detailed description. Rather, the embodiments were chosen and described so that others skilled in the art may utilize their teachings.

Figure 1:
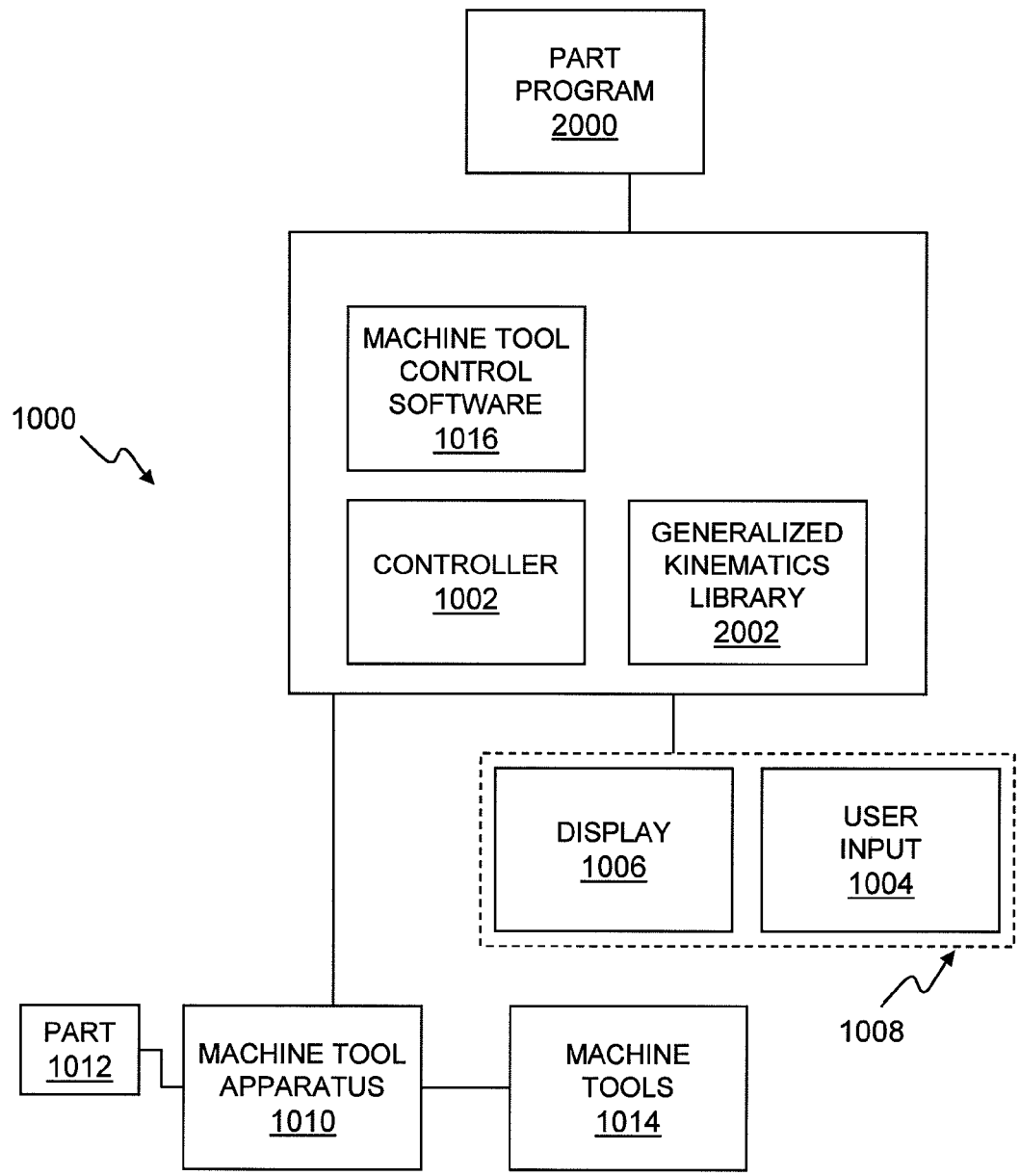
FIG. 1 is a block diagram of an exemplary machine tool system.

Referring now to FIG. 1, an exemplary representation of a machine tool system 1000 is shown. Machine tool system 1000 includes a controller 1002, machine tool control software 1016 and a generalized kinematics library 2002 as described in the '971 Application. Controller 1002 interfaces with user input devices 1004 and display devices 1006. User input devices 1004 and display devices 1006 are collectively shown as a user interface 1008. Exemplary user interfaces include the MAX Single Screen Control console and the ULTIMAX Dual Screen Control console both available from Hurco Companies, Inc. located in Indianapolis, Ind., the assignee of the present application.

Controller 1002 is further coupled to a machine tool apparatus 1010 which supports a part 1012 to be machined with one or more machine tools 1014. Exemplary machine tool apparatuses 1010 include the vertical machining centers, the horizontal machining centers, the 5-axis machining centers, and the turning centers available from Hurco Companies, Inc. located in Indianapolis, Ind., the assignee of the present application.

Figure 2:
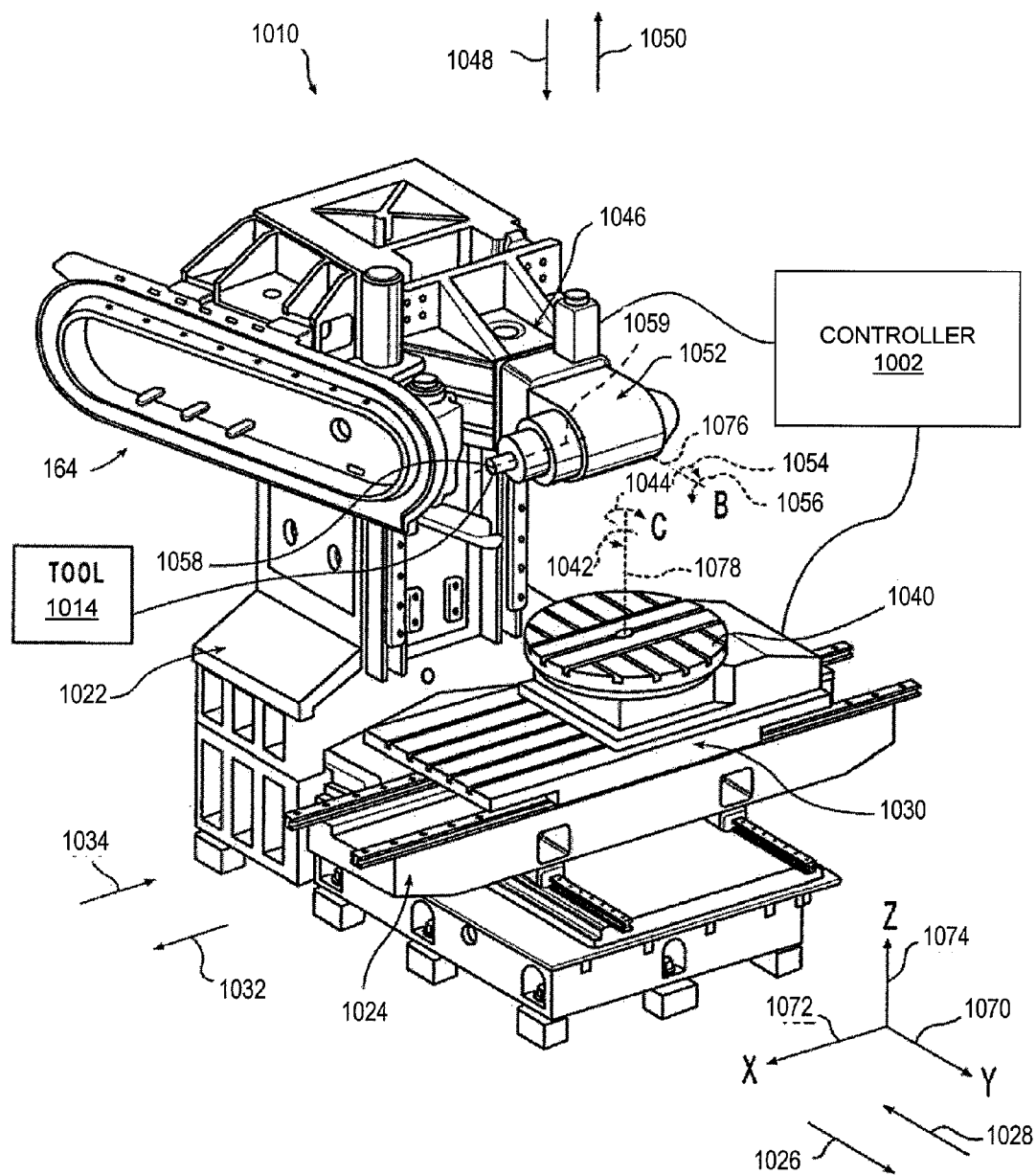
FIG. 2 is a perspective view of an exemplary machine tool apparatus.

Referring to FIG. 2, an exemplary machine apparatus 1010 is shown. Machine tool apparatus 1010 includes a frame 1022 having a first saddle 1024 coupled thereto. Saddle 1024 is translatable in directions 1026 and 1028. A second saddle 1030 is supported by first saddle 1024. Saddle 1030 is translatable in directions 1032 and 1034 relative to saddle 1024. A platform 1040 is supported by saddle 1030 and is rotatable relative to saddle 1030 in directions 1042 and 1044. In one embodiment, each of saddle 1024, saddle 1030, and platform 1040 are moveable through motors which are controlled by controller 1002.

Further, a third saddle 1046 is supported by frame 1022. Saddle 1046 is translatable in directions 1048 and 1050. Saddle 1046 supports a rotatable member 1052. Rotatable member 1052 is rotatable in directions 1054 and 1056 relative to saddle 1046. In one embodiment, each of saddle 1046 and rotatable member 1052 are moveable through motors which are controlled by controller 1002.

A tool spindle 1058 is supported by platform 1052. Various tools 1014 may be coupled to tool spindle 1058 to perform various operations with machine tool apparatus 1010. Exemplary tools 1014 include and an end mill, a drill, a tap, a reamer, and other suitable tools. Tool spindle 1058 is rotatable about a tool spindle axis 1059 to input a rotation to the tool 1014.

The movement of saddle 1024 in direction 1026 or direction 1028 is illustrated as a movement in a Y-axis 1070. The movement of saddle 1030 in direction 1032 or direction 1034 is illustrated as a movement in an X-axis 1072. The movement of saddle 1046 in direction 1048 and direction 1050 is illustrated as a movement in a Z-axis 1074. The rotation of rotatable member 1052 in direction 1054 or direction 1056 is illustrated as a movement in a B-axis 1076. The rotation of platform 1040 in direction 1042 or direction 1044 is illustrated as a movement in a C-axis 1078. Machine tool apparatus 1010 is an exemplary 5-axis machine. In one embodiment, one of B-axis 1076 and C-axis 1078 is replaced with an A-axis wherein platform 1040 is tiltable about one of X-axis 1072 and Y-axis 1070.

Through the movement of one or more of the 5-axes of machine tool apparatus 1010 a tool 1014 may be positioned relative to a part 1012 supported by platform 1040 to be machined. Part 1012 may be secured to platform 1040 to maintain the position of part 1012 to platform 1040. The movement of one or more of the 5-axes of machine tool apparatus 1010 is controlled through controller 1002. Returning to FIG. 1, controller 1002 executes machine tool control software 1016 to process information specified in a part program 2000. It should be understood that the methods described herein may be implemented as instructions in software 1016 and executed by controller 1002. Software 1016 may be embodied in a computer readable medium which may be a single storage device or include multiple storage devices, located either locally with controller 1002 or accessible across a network. Computer-readable media may be any available media that may be accessed by controller 1002 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which may be used to store the desired information and which may be accessed by controller 1002. In one embodiment, controller 1002 may be a single computing device. In another embodiment, controller 1002 may include multiple computing devices.

As described herein, part program 2000 is machine independent. Such a machine-independent part program 2000 is capable of being executed on any of a variety of different machine tool systems 1000, each having different kinematics configurations corresponding to four or more moveable axes. Part program 2000 defines the geometry of the part features and the machining parameters to cut them. Controller 1002 generates the tool path which includes the position and orientation of tool 1014 relative to the workpiece coordinate system, which is a coordinate system oriented relative to part 1012 to be machined or the subject of simulated machining. Part setups determine the workpiece location and orientation in the workspace volume of a particular machine tool apparatus 1010. Controller 1002 is able to determine the appropriate positions for each axis of the machine tool apparatus 1010 for all motion required for the machining specified by part program 2000 based on the instructions provided by the part program and the kinematics configuration of the particular machine tool apparatus 1010.

In one embodiment, controller 1002 works in accordance with the teachings of the '971 Application incorporated herein above. In general, after part program 2000 is created including feature geometries and the machining parameters to cut the features (i.e., tool selections, finish characteristics, etc.), controller 1002 processes the program. As is further described below, the processing steps generally include generating a feature-relative tool path, sending the tool path to generalized kinematics library 2002 for processing, transforming the tool path to a specified location and orientation on part 1012, and generating machine axes motion based on the machine-specific kinematics.

The machine-independent part program 2000 described herein may be configured to operate on any machine tool system 1000 having three or more axes, regardless of the axes kinematics configuration. The present disclosure, however, is more specifically directed to the generation and execution of part programs 2000 configured for operation on machine tool systems 1000 having four or more axes, including at least one rotary and/or tilting axis. The part programs are generated using a conversational programming Application Program Interface (API) that permits the user to describe the workpiece features (or geometry) to be formed and various characteristics of the cutting operations, all independent of the machine kinematics configuration. The part programs 2000 do not describe machine axes moves. Instead, controller 1002 determines which axes move to cut the features described in the part program 2000.

Since part program 2000 described herein is independent of the machine axes kinematics configuration, the same part program can be used to generate movement on any machine tool system 1000 with software 1016 provided that such movement does not violate axes limits (i.e., require moves that exceed the workspace volume of the machine tool) and the machine tool apparatus 1010 has all the axes required by program 2000 (for example, a 5-axis program that requires both rotary and tilt axes cannot run properly on a 4-axis or 3-axis machine).

In one embodiment of the disclosure, the API does not use conventional ABC rotary axes names. Instead, for example, part programs 2000 generated using the API use IV and V for the rotary and tilt axes, respectively. The axis names IV and V are defined to correspond to the alphabetical order of the names of the axes present on the particular machine tool apparatus 1010 that is executing part program 2000. The following examples illustrate this naming convention:

SR machine with B tilt and C rotary axes:
 IV=B
 V=C
VTXU machine with A tilt and C rotary axes:
 IV=A
 V=C
VMX machine with AB table (A rotary, B tilt)
 IV=A
 V=B
SR machine without C-axis (B tilt)
 IV=B
 V=ignored by the control software because it does not exist.

During part setup, the orientation and location of part 1012 in the workspace of machine tool apparatus 1010 is described with reference to the actual machine axes (i.e., A, B, and/or C). By using generic axis names for rotary and tilt axes, the part program 2000 generated using the present teachings provides an axis naming convention that is independent of the particular machine tool system 1000 executing the part program 2000. The IV and V axes are translated at execution into the actual machine axes in the manner described above.

Part programs 2000 generated according to the present teachings and their associated part setup APIs are not associated with a specific machine kinematics configuration until the host application begins program execution. During execution, control software 1016 maps the numerically defined axes (i.e., the IV and V axes) to the axes available in the kinematics model with which the process is executing. The kinematics model is selected for example by either executing the process of milling on a particular machine tool apparatus 1010 or executing a program simulation.

As described below, the API screens according to the present disclosure include data fields relating to the IV and V rotary axes, regardless of whether there are rotary axes actually present on the current machine tool apparatus 1010 because the configuration of axes of the current machine tool apparatus 1010 is not known until the moment of process execution (e.g., milling or graphical simulation). As indicated above, if the current machine tool apparatus 1010 is a 4-axis machine, then the V axis data of part program 2000 is ignored by controller 1002. If the current machine tool apparatus 1010 is a 3-axis machine, then both IV and V axes are ignored.

Figure 3:
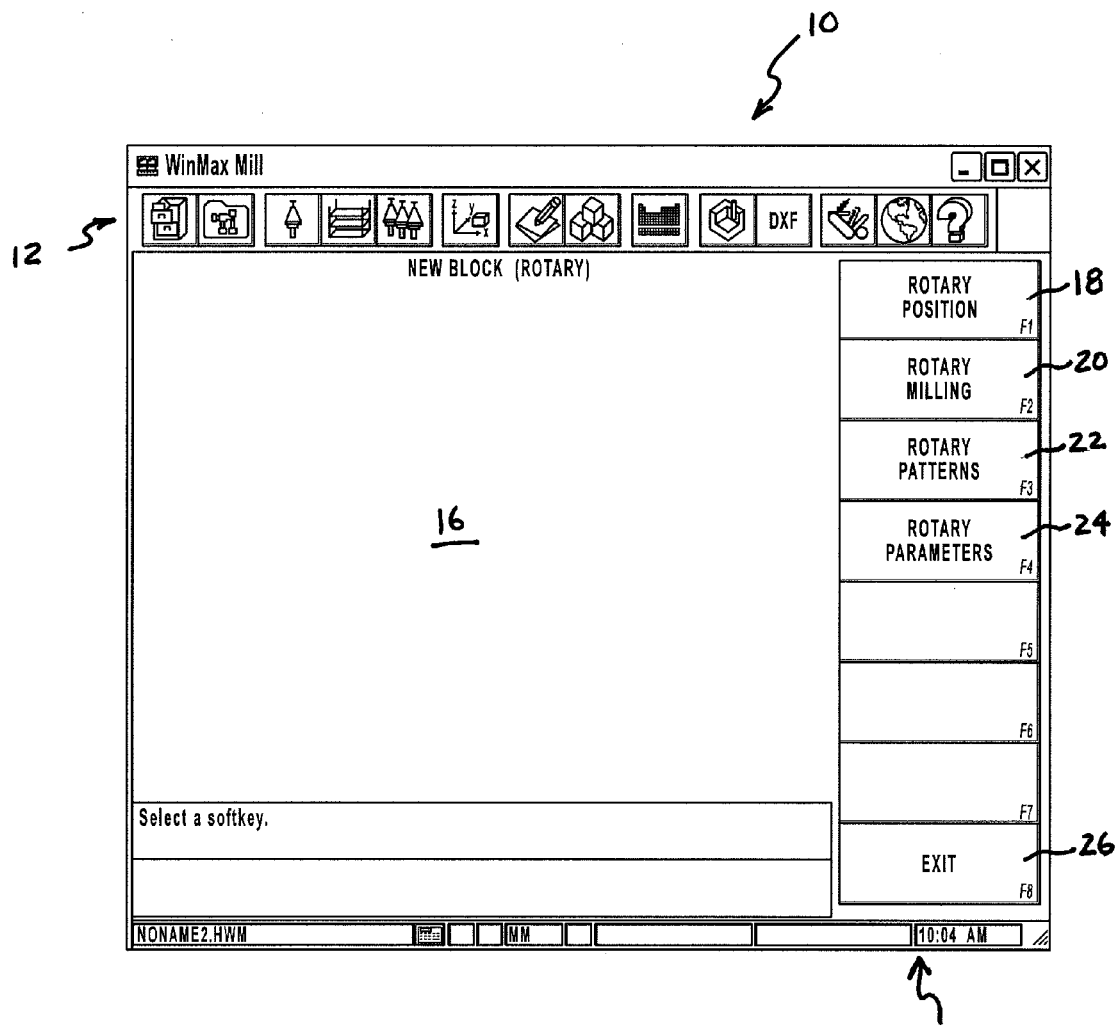
FIG. 3 is a new block screen generated by the API of the present disclosure.

Referring now to FIG. 3, a new block screen 10 generated by the API of the present disclosure is shown. New block screen 10 is generated on display 1006 to permit a user to create and/or edit programming blocks of part program 2000 using the conversational programming methodology described, for example, in U.S. Pat. No. 5,453,933, the disclosure of which is expressly incorporated herein by reference. Screen 10 includes a command bar 12 having a plurality of icons for activating various interface and configuration functions, a function bar 14 having a plurality of function icons for selecting additional programming screens, and a work space 16. Function bar 14 includes a rotary position icon 18, a rotary milling icon 20, a rotary patterns icon 22, a rotary parameters icon 24 and an exit icon 26. In general, the user interacts with screen 10 via input device 1004 (e.g., a touchscreen or pointing device) to generate and/or edit part program 2000. As indicated by their names, the various function icons 18, 20, 22, 24 relate to machining operations requiring tool rotation or tilting for forming parts having curved outer surfaces. Such parts include, for example, cylinders, spheres, cones, and parts having NURBS surfaces. It should be noted, however, that while the remainder of this description refers to operations on a cylindrical part 1012, the teachings of the present disclosure may readily be adapted for operations on any part having a curved outer surface or, most commonly, for machining any of a variety of features on parts of any shape when the machining requires use of a machine tool apparatus 1010 having at least four movable axes.

As is further described below, the present disclosure includes use of transform planes for defining new coordinate systems relative to previously established coordinate systems. This permits the creation of features on parts 1012 using the new coordinate systems. Cylindrical machining, as primarily described herein, is simply one application of these concepts. The teachings described herein enable universal programming for machining 3-axis features (e.g., pockets, holes, etc.) on different (transformed) planes of a part 1012 using a four-plus axis machine. Moreover, while this specification describes the orientation of cutting tool 1014 as being along the Z-axis of the transformed coordinate systems, this is merely a default orientation which may be considered most convenient by users. The teachings of the present disclosure support any tool orientation in the transformed coordinate systems as may be required or desirable for forming a particular feature or otherwise controlling movement.

The teachings according to the present disclosure permit a user to create a machine-independent part program for machining features on a cylinder that is off-axis and off-centerline relative to the rotary axis of the machine tool apparatus 1010. Conventional techniques for cylindrical milling, for example, require that the cylinder to be machined be positioned precisely on the centerline of one of the machine's rotary axes. As described herein, the present disclosure permits the user to position the cylinder anywhere in the machine's workspace because the techniques described in the '971 Application perform the interpolation necessary to perform the cutting operations regardless of the position and orientation of the cylinder. As described below, rotary features defined using the conversational API of the present disclosure are processed by mapping 3-dimensional points onto cylinders having a cylinder axis, zero angle and radius (see FIG. 7). The user may define any orientation and/or location for the cylinder axis. Transform planes (described below) can also be used to transform the cylinder orientation and location.

Figure 4:
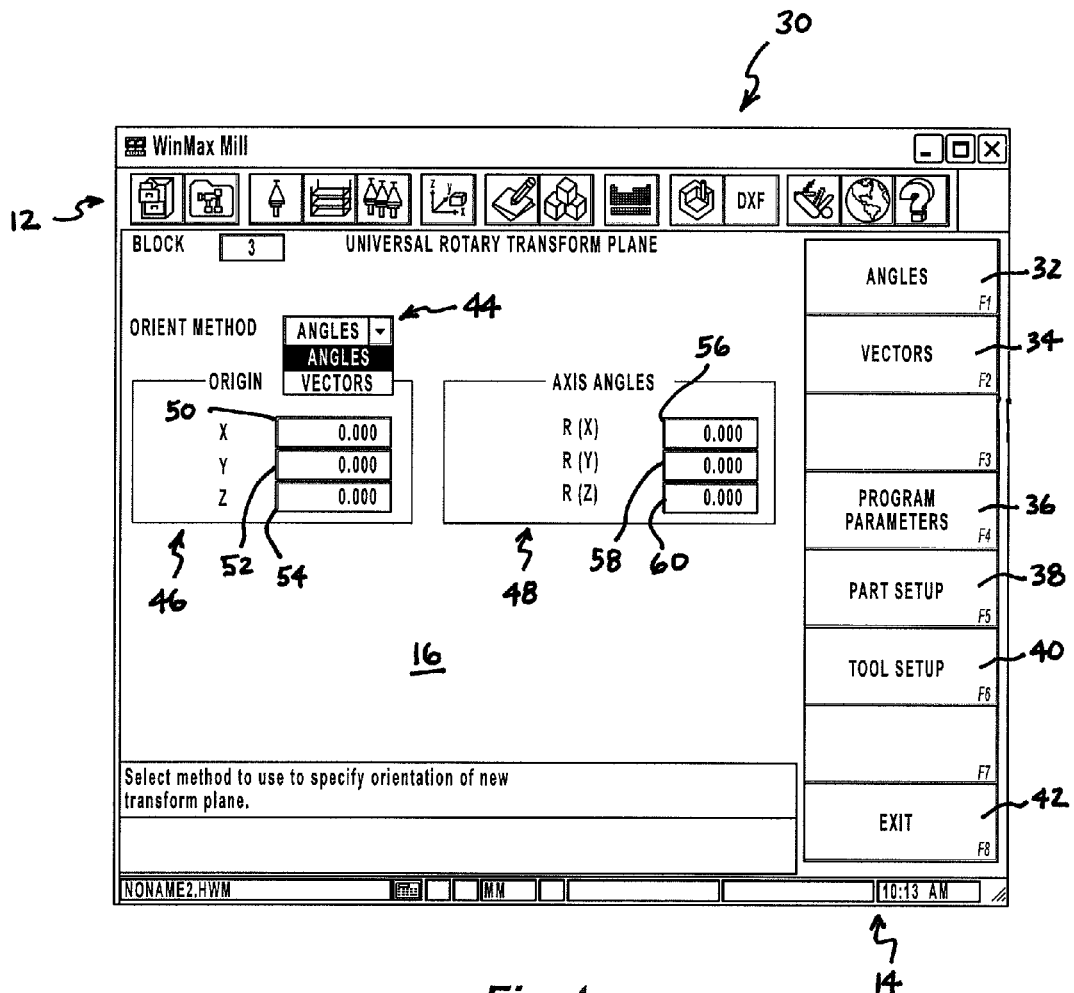
FIGS. 4 and 5 are rotary transform plane screens generated by the API of the present disclosure.

When generating or editing part program 2000 using the teachings of the present disclosure, the user may specify a coordinate system relative to which operations in subsequent blocks of part program 2000 are to be performed. In this manner, the user can specify geometries to be formed on part 1012 with reference to the user inputted coordinate system as opposed to a coordinate system based on the kinematics of the particular machine tool apparatus 1010. During programming, the user invokes a rotary transform plane screen 30 as depicted in FIG. 4 by actuating rotary patterns icon 22 of FIG. 3.

Rotary transform plane screen 30 permits the user to define how a current coordinate system being used during execution of part program 2000 is to be rotated to establish a new coordinate system, without requiring machine axes input. Instead, a programming block can be created using screen 30 using angles or vectors similar to programming NC Transform Planes (G68.2) with v7.1 SR software. The main difference from NC Transform Planes is that controller 1002 of the present disclosure, in one embodiment, automatically orients tool 1014 such that it is perpendicular to the XY plane of the transform plane (i.e. lies along the local Z-axis direction of the transform plane). Again, however, as mentioned above, this is a default orientation of tool 1014 that may be changed as desired by the user.

In addition to command bar 12 and workspace 16, rotary transform plane screen 30 includes a function bar 14 having an angles icon 32, a vectors icon 34, a program parameters icon 36, a part setup icon 38, a tool setup icon 40, and an exit icon 42. Workspace 16 includes an orientation method selection drop down 44 which permits the user to choose between angles and vectors. Workspace 16 further includes an origin area 46 and an axis angles area 48. Origin area 46 includes an X data field 50, a Y data field 52 and a Z data field 54. Axis angles area 48 includes an R(X) data field 56, an R(Y) data field 58, and an R(Z) data field 60.

As should be apparent to one skilled in the art, X data field 50, Y data field 52, and Z data field 54 permit the user to define where, relative to the origin point of the current coordinate system, the origin of the new coordinate system will lie. R(X) data field 56 specifies a rotation about the current X-axis for the new coordinate system. Similarly, R(Y) data field 58 specifies a rotation about the current Y-axis as oriented after the above-specified rotation according to R(X) data field 56. Finally, R(Z) data field 60 specifies a rotation about the current Z-axis as oriented after the above-specified rotation according to R(X) data field 56 followed by the above-specified rotation according to R(Y) data field 58. As should also be apparent from the foregoing, the R(X, Y, Z) rotations do not necessarily correspond to setting a machine's ABC axes.

Figure 5:
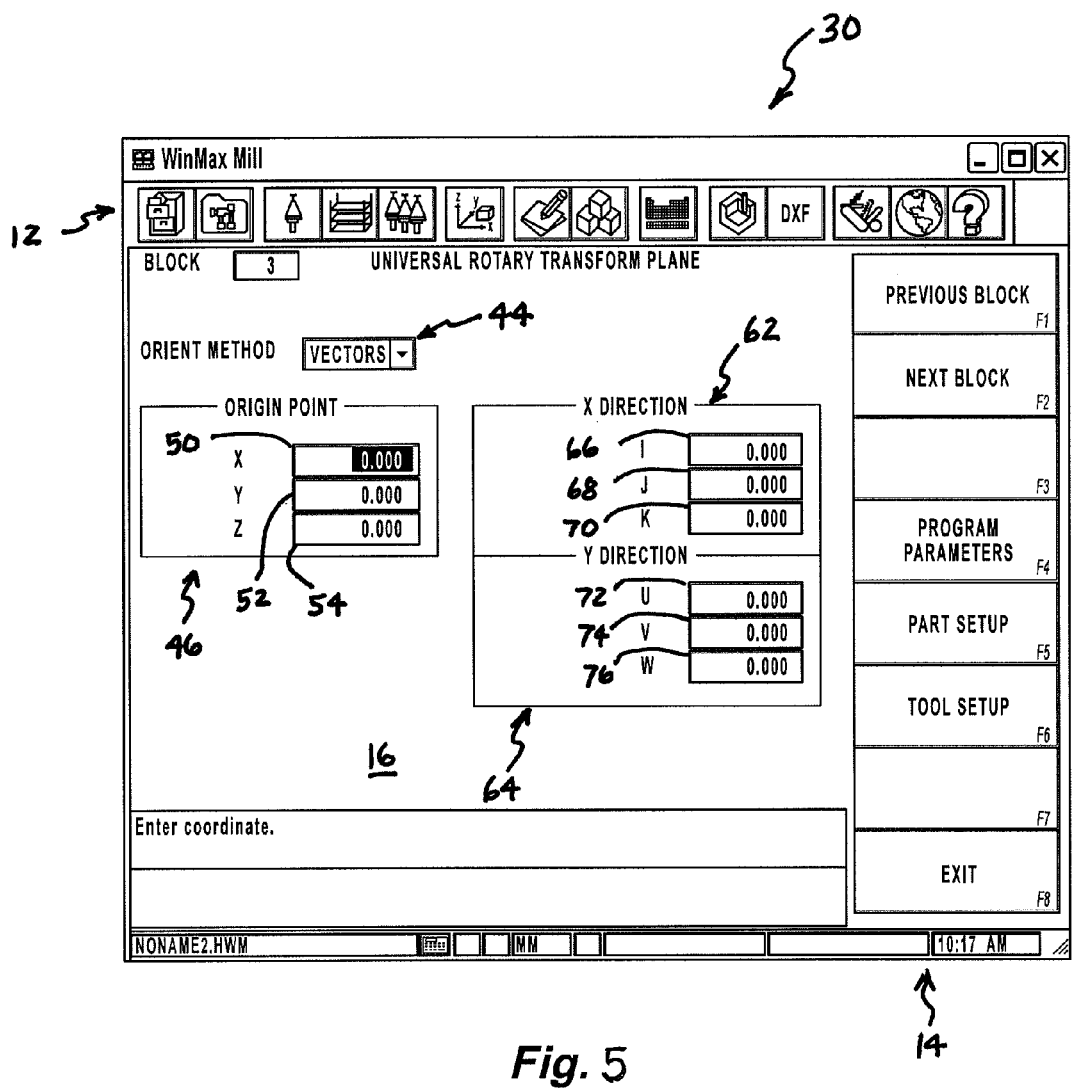

As indicated above, the user may also select vectors from orientation method selection drop down 44. As shown in FIG. 5, if vectors is selected, workspace 16 is populated with an X direction area 62 and a Y direction area 64 instead of axis angles area 48. X direction area 62 includes an I data field 66, a J data field 68, and a K data field 70. Y direction area 64 includes a U data field 72, a V data field 74 and a W data field 76. This permits the user to define the new coordinate system (relative to the newly defined origin using origin area 46) using X and Y vectors only. Once the new X and Y vectors are defined, the Z vector is automatically determined as a vector perpendicular to the new X and Y vectors.

More specifically, with the vectors method selected, the user specifies new X-direction vector by inputting data in fields 56, 58, 60 and the new Y-direction vector by inputting data into fields 72, 74, 76. These data are specified with respect to the current coordinate system in a manner similar to that used in NC Transform Plane with vector input. The X-direction vector and the Y-direction vector should be perpendicular to one another and have non-zero values. If the user fails to provide data that satisfies these requirements, controller 1002 will fix the X-axis along the specified X-direction vector and force the Y-direction vector to be perpendicular to the X-direction vector and to lie in the plane described by the data in data fields 66, 68, 70, 72, 74, and 76.

Whether the user selects the angles method (FIG. 4) or the vectors method (FIG. 5) to create a transform plane definition block, the commands included in the part program blocks following the transform plane definition block will be interpreted relative to the new coordinate system resulting from the transform plane definition block. Additionally, transform planes can be stacked in part program 2000. In other words, multiple transform plane blocks may be inserted into part program 2000 in the manner described above, and each transform plane encountered during execution will result in a new coordinate system (as specified by the transform plane) relative to the last called or currently active coordinate system. Each transform plane requires a transform plane end block to cancel it from the stack.

Figure 6:
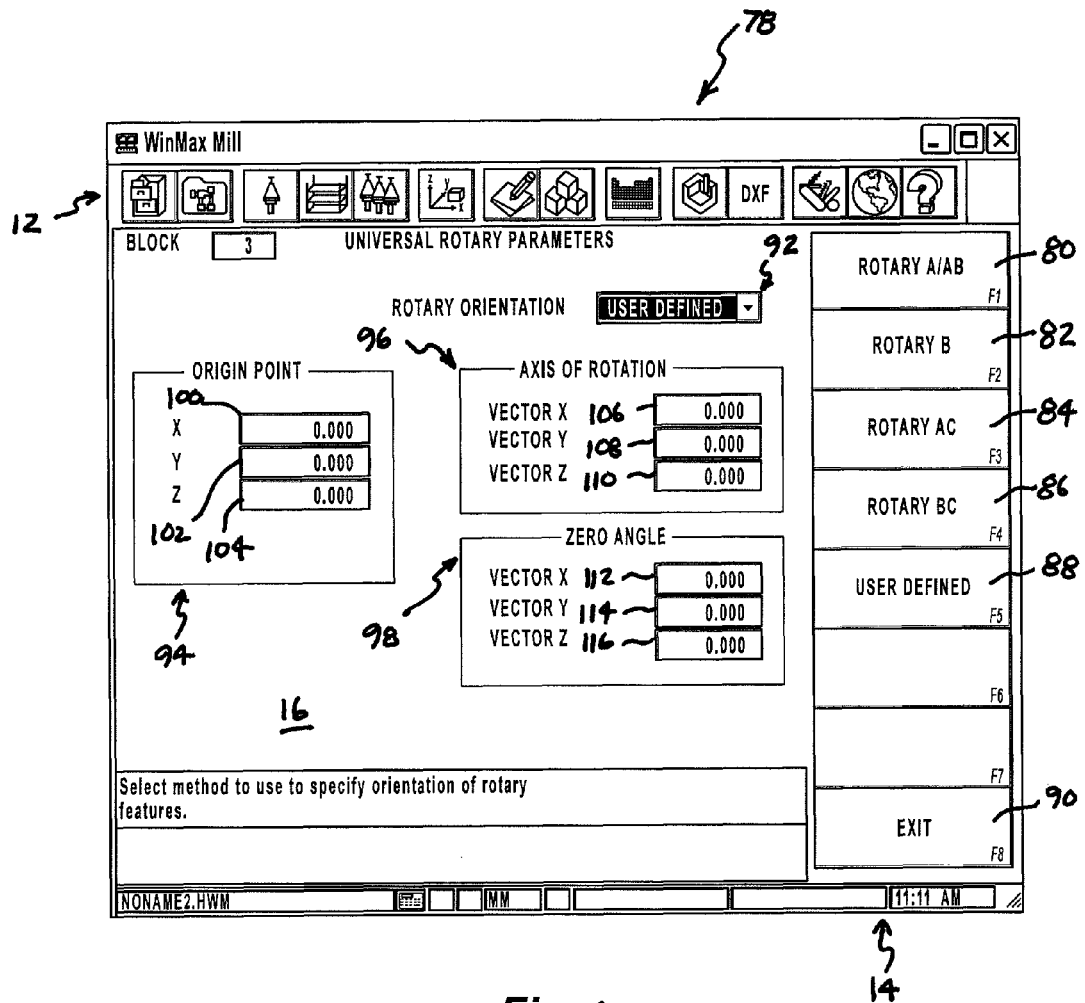
FIG. 6 is a rotary parameters screen generated by the API of the present disclosure.

Referring now to FIG. 6, a rotary parameters screen 78 is shown as a result of actuating rotary parameters icon 24 of FIG. 3. Rotary parameters screen 78 includes a command bar 12, a function bar 14 and a workspace 16. Function bar 14 includes a rotary A/AB icon 80, a rotary B icon 82, a rotary AC icon 84, a rotary BC icon 86, a user defined icon 88, and an exit icon 90. Workspace 16 includes a rotary orientation drop down 92, an origin area 94, an axis of rotation area 96, and a zero angle area 98. Origin area 94 includes an X data field 100, a Y data field 102, and a Z data field 104. Axis of rotation area 96 includes a vector X data field 106, a vector Y data field 108, and a vector Z data field 110. Finally, zero angle area 98 also includes a vector X data field 112, a vector Y data field 114, and a vector Z data field 116.

Rotary parameters screen 78 permits the user to define the orientation and location of a cylindrical rotary feature relative to the current coordinate system. The transformation defined using screen 78 is only applied to rotary features (e.g., rotary frames, rotary contours, etc.) that are mapped to cylinders and will not affect linear features (e.g., mill frames, etc.).

Figure 7:
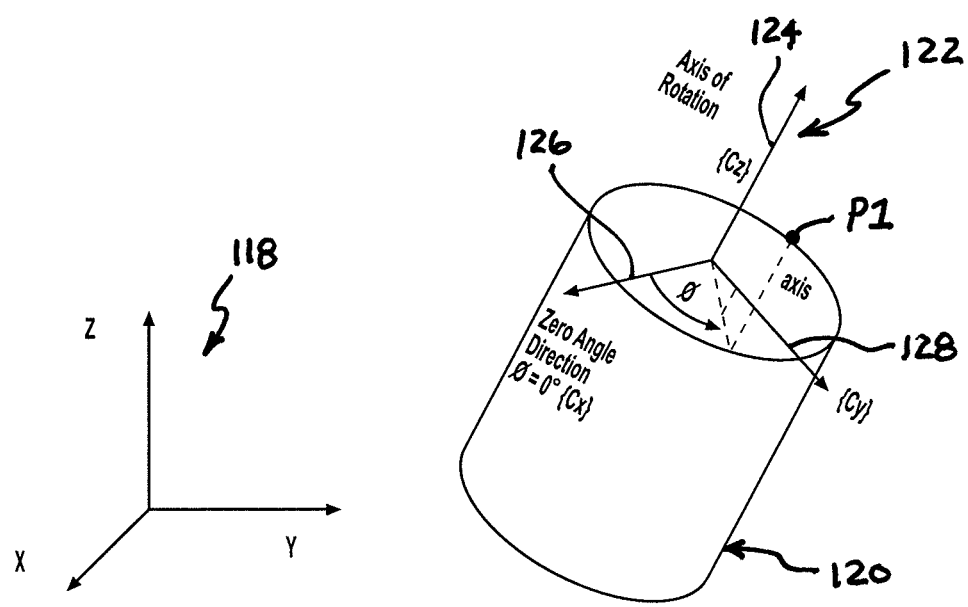
FIG. 7 is a conceptual diagram depicting the relationship between a first Cartesian coordinate system and a Cartesian coordinate system associated with a cylindrical workpiece.

As shown in FIG. 6, the user defined option has been selected using the rotary orientation drop down 92. User defined orientation requires the specification of an axis of rotation (area 96), which corresponds to a cylinder axis vector, and a zero angle vector (area 98), both with respect to the current coordinate system. Referring to FIG. 7, a current coordinate system 118 is shown, along with a cylinder 120 and a cylinder coordinate system 122. The axis of rotation defined by the user in area 96 of FIG. 6 is depicted as axis 124 of cylinder coordinate system 122. The zero angle vector defined by the user in area 98 of FIG. 6 corresponds to the zero-angle cylindrical point vector 126 of cylinder coordinate system 122. Vector Cy 128 is simply an axis perpendicular to axis of rotation 124 and zero angle vector 126. Cylinder coordinate system 122 is a Cartesian coordinate system centered on cylinder 120. As is further described below, points on cylinder 120 may be defined relative to cylinder coordinate system 122 using cylindrical coordinates. As shown, a point (P1) may be defined on cylinder 120 using an angle (Φ) relative to zero angle vector 126, a radius (r) from axis of rotation 124, and a distance (axis) along axis of rotation 124. Current coordinate system 118 may be the workpiece coordinate system or a transform plane coordinate system.

Figure 8:
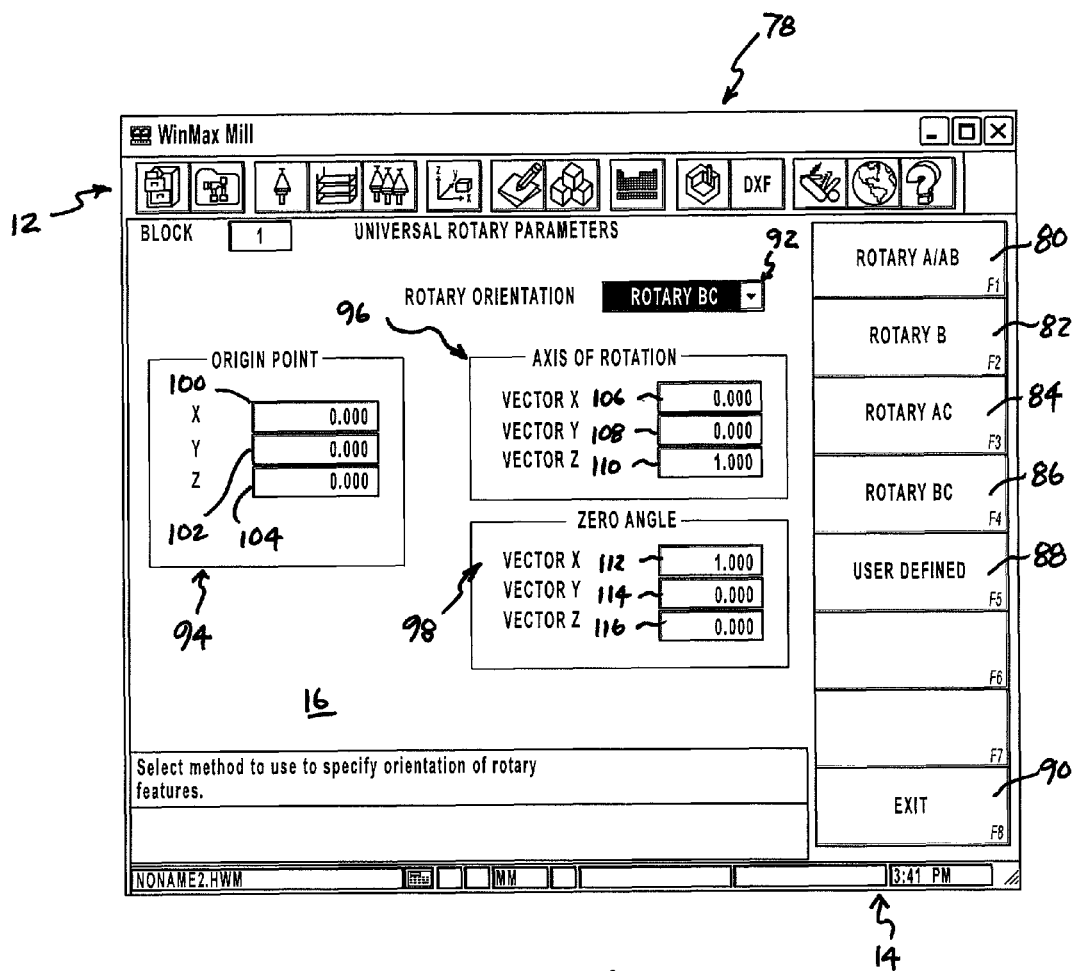
FIG. 8 is another rotary parameters screen generated by the API of the present disclosure.

Referring again to FIG. 6, the user may select other orientations (i.e., instead of user defined) using either drop down 92 or any of icons 80, 82, 84, or 86 in function bar 14. Selection of any of these other orientations, which correspond to common machine configurations, automatically converts data in axis of rotation area 96 and zero angle area 98 into data that describes the rotary features of the machine configuration. For example, if the user selects rotary BC icon 86 (or the rotary BC option from drop down 92), the new coordinate system is defined with the axis of rotation 124 along the Z-axis of the machine as shown in FIG. 8.

Figure 9:
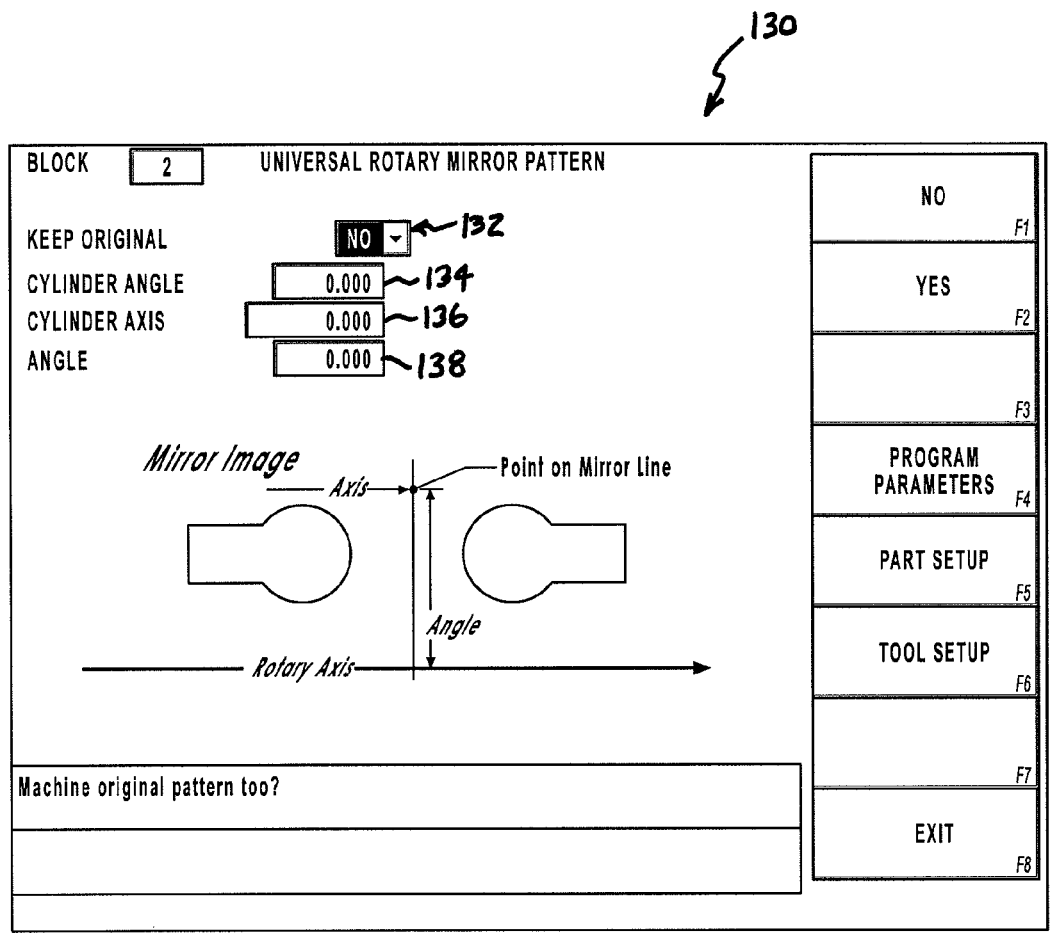
FIG. 9 is a rotary mirror pattern screen generated by the API of the present disclosure.

The API of the present disclosure permits the user to define a variety of geometries as part program blocks in a conversation manner. One example is the rotary mirror pattern, which may be defined using rotary mirror pattern screen 130 of FIG. 9. Screen 128 may be invoked by actuating rotary patterns icon 22 (FIG. 3) and selecting a rotary mirror icon (not shown). When machining cylindrical parts, it is common to machine features that are mirror images of one another. Workspace 16 of screen 130 includes a keep original drop down 132, a cylinder angle data field 134, a cylinder axis data field 136, and an angle data field 138. Keep original drop down 132 permits the user to decide whether to form two, mirror image features (by selecting "yes"), or forming just the mirror image of a feature without forming the original feature (by selecting "no"). The rotary axis arrow in the diagram of FIG. 9 is, in this embodiment, an axis that is wrapped around a cylinder. Cylinder angle data field 134 and cylinder axis data field 136 permit the user to define a point (identified as "Point on Mirror Line" in FIG. 9) through which the "mirror" passes. The mirror plane also includes a radial vector of the cylinder that passes through this point. As a point and a radial vector do not define a plane, the mirror plane is fully defined as passing through a line on the cylinder. The default line is the center line of the cylinder. However, the user can set a different orientation for the mirror plane by inputting data into angle data field 138, which defines a rotation of the mirror plane about the radial vector at that point.

Mirror image patterns as defined using screen 130 are unique in the processing of part program 2000 according to the present disclosure in that mirror image features are transformed and applied in Cartesian coordinates during tool path generation, as will be further described with reference to FIG. 12A. This is because mathematically, it is more convenient to generate mirror image features in 3D space than it is to create them in a cylindrical coordinate system.

Figure 10:
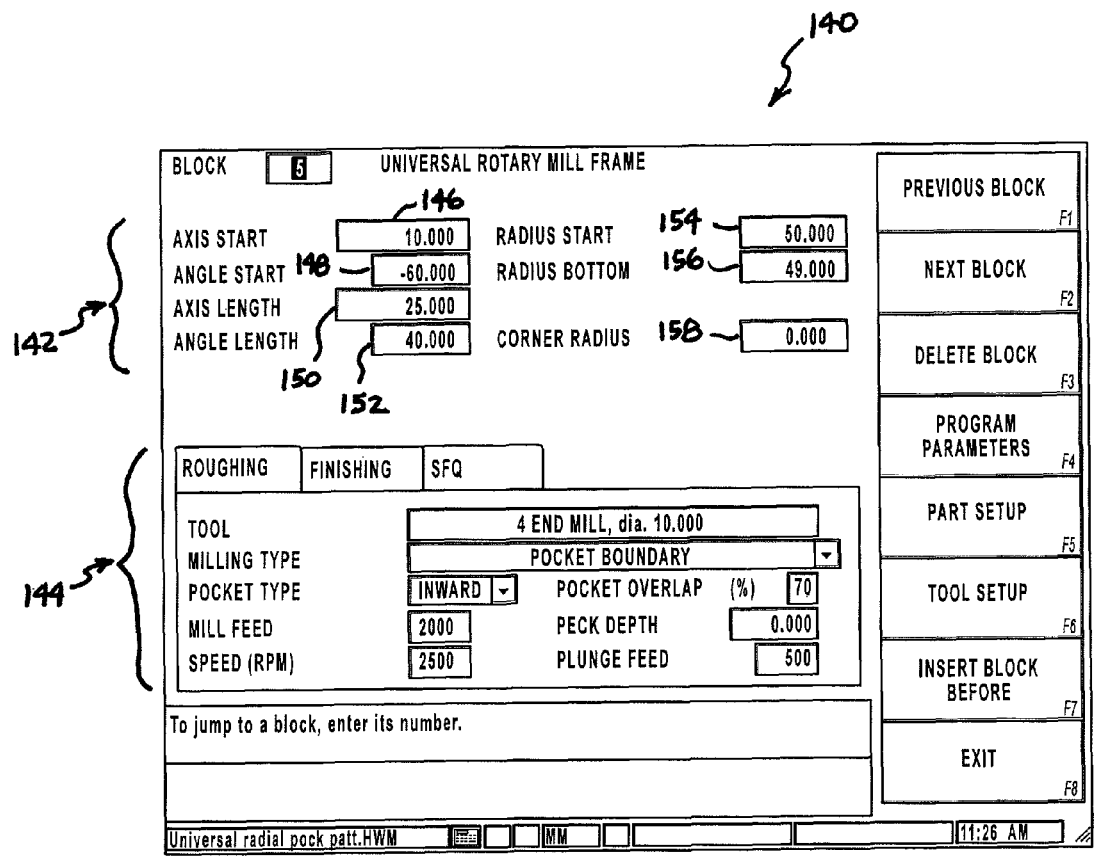
FIG. 10 is rotary mill frame screen generated by the API of the present disclosure.

Referring now to FIG. 10, a rotary mill frame screen 140 is shown. Screen 140 may be obtained by actuating rotary milling icon 20 of FIG. 3, then selecting a rotary frame icon (not shown). A rotary mill frame is a simple rectangular pocket that is wrapped around a cylinder, and is one of many different cylindrical features or geometries that may be defined using the conversational programming APIs of the present disclosure. These geometries may be defined by either entering data in cylindrical coordinates (i.e., cylinder axis, angle, and radius), or entering data in Cartesian coordinates (i.e., 3-axis data blocks) which are converted to cylindrical coordinates.

As shown in FIG. 10, screen 140 includes in workspace 16 a geometry definition area 142 and an operations area 144, which allows the user to specify various parameters relating to the manner in which the geometry is created. Geometry definition area 142 includes, in this example, an axis start data field 146, an angle start data field 148, an axis length data field 150, an angle length data field 152, a radius start data field 154, a radius bottom data field 156, and a corner radius data field 158. Axis start data field 146 allows the user to specify the starting position of the frame relative to the origin specified using rotary parameters screen 78 of FIG. 6. Axis length data field 150 contains data specifying the length of one side of the rectangular frame from the starting location specified in axis start data field 146. The data in angle start data field 148 specifies the beginning angle of the frame relative to the zero angle specified in zero angle area 98 of FIG. 6. As should be apparent from the foregoing, nothing in screen 140 requires reference to any machine kinematics because the part program block generated using screen 140, like all of the program blocks created using the teachings of the present disclosure, is entirely machine-independent. FIG. 12A shows where the cylindrical input API of FIG. 10 resides in the transformation sequence of the present disclosure.

A convert to cylindrical coordinate system input API permits the operator to program 3D machining geometry with respect to an orthogonal Cartesian Coordinate system as opposed to a cylindrical coordinate system. The data block feature is then converted to cylindrical coordinates by wrapping the geometry to a cylinder using a mapping transformation.

Figure 11:
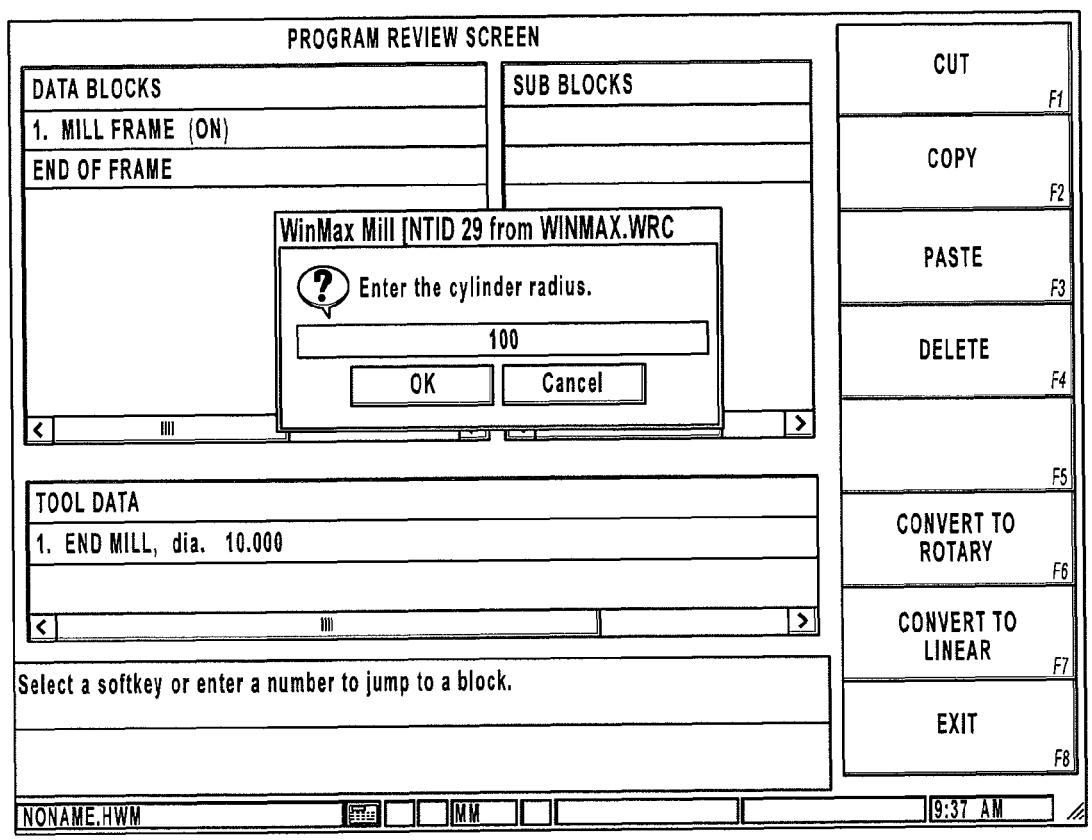
FIG. 11 is a screen depicting a conversion of a milling feature to a cylindrical feature.

In one embodiment of the present disclosure, Cartesian coordinates are wrapped to cylindrical coordinates using a transformation that maps the Cartesian X-axis to the cylindrical coordinates angle, the Y-axis to the cylinder axis, and the Z-axis to the radius as described in the equation below:

$$\text{Cylinder Axis} = Y$$
$$\text{Cylinder Angle (radian)} = \frac{X}{\text{Mapping Radius}}$$
$$\text{Cylinder Radius} = Z$$

where the Mapping Radius is the radius entered by the user for the conversion process as shown in FIG. 11. FIG. 11 shows an example of converting a 3D frame to a cylinder mapped to a 100 mm radius. FIG. 12A shows where this Cartesian input API resides in the transformation sequence. The cylinder wrapping map transformation is not limited to the mapping described in the above equation. An additional transformation can be applied to the Cartesian XYZ coordinates prior to wrapping to the cylinder, thus allowing the system to wrap the machining geometry to any orientation on a cylinder:

Cylinder Coordinates=Cylinder Wrapping Map Transform×3D Transform×Cartesian Coordinates where 3D Transform is a general transformation matrix (for example, rotation about Z-axis).

Rotary patterns (such as a rotary loop pattern) and the rotary parameter transforms (FIG. 6) are applied only to cylindrical feature data blocks. While rotary pattern blocks are cancelled using a rotary pattern end block, the rotary parameter transformation is modal throughout the program execution, but can be changed at any point in the program.

Figure 12B:
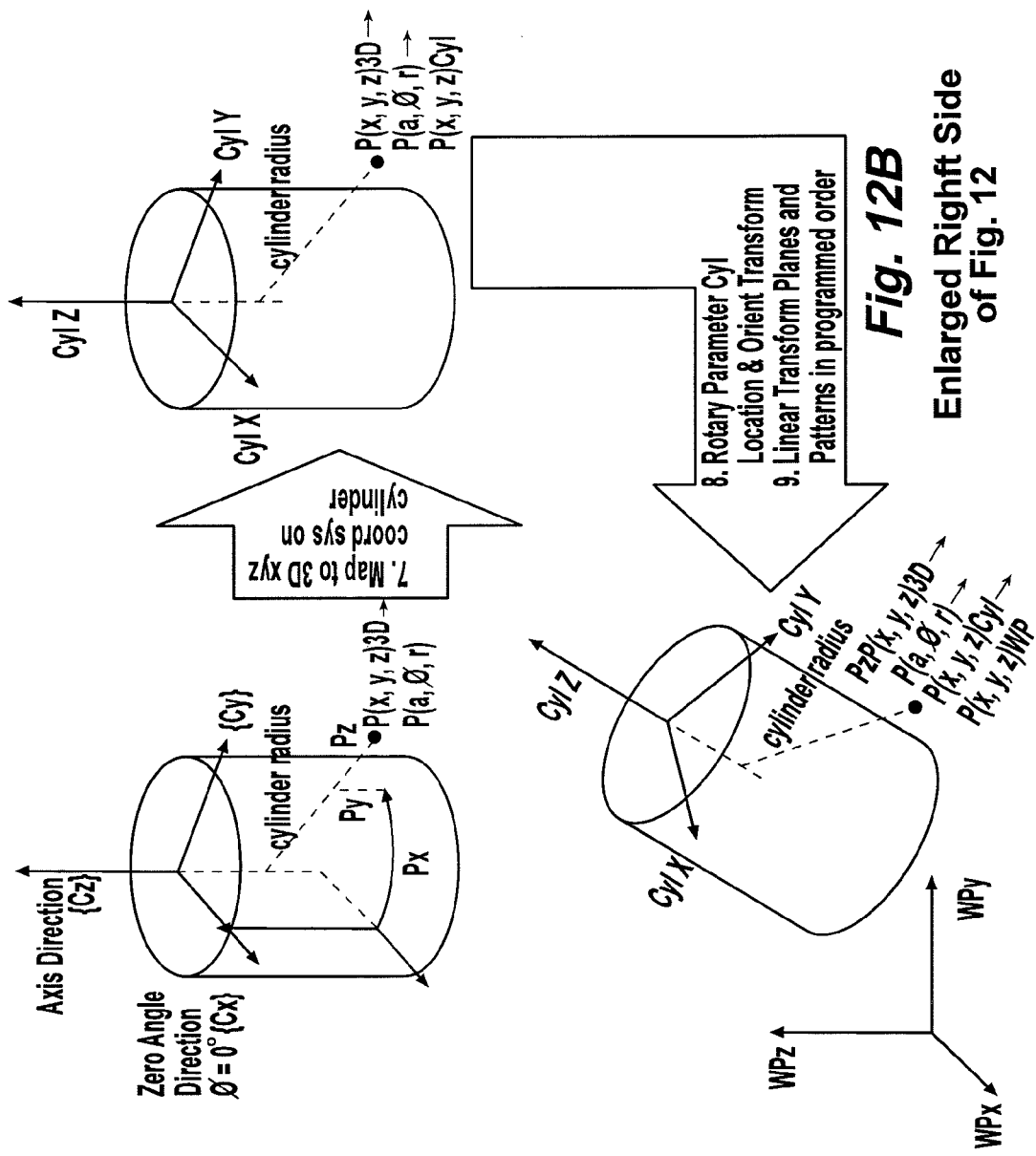

FIGS. 12A and 12B show the transformation sequence used to process universal conversational part program cylindrical features programmed according to the teachings of the present disclosure. If a data block is defined using cylindrical coordinates, the process begins at Step 1 in FIG. 12A. If the data block is defined with Cartesian coordinates, the process begins at Step 2. The steps in the figure are generally described below:

The transform sequence is as follows (FIGS. 12A and 12B):

1. Transform cylindrical feature coordinates to Cartesian coordinates using the cylinder mapping radius;
2. Apply any radial patterning to the Z-direction in Cartesian coordinates (feature Z-direction is selected to be mapped to radius of cylinder);
3. Process geometry and generate 3-axis tool path (the output of step #3 is a tool path in Cartesian coordinates).
4. Apply any rotary mirror features in Cartesian coordinates;
5. Convert (i.e., map) all Cartesian coordinate points to cylindrical coordinates (radius, angle, axis);
6. Apply any rotary patterns to cylindrical coordinates (e.g., rotary loop, rotary locations, rotary rectangular), excluding radial patterns that are applied in Step #2 (the output of Step #6 is the cylindrical tool path relative to the current coordinate system);
7. Cylindrical patterned coordinates are inverse mapped to Cartesian coordinates fixed to the cylinder;
8. Rotary parameter block's cylinder orientation and location transform is applied. This transform is similar to a transform plane in a matrix stack. Indeed, steps #3 through #9 and processes in step #10 are matrices in various matrix stacks that exist in the generalized kinematics library 2002 as is further described in the '971 Application;
9. Linear transform planes and linear patterns are applied in the sequence they are called in the program.
10. Data from Step #9 is tool tip and tool vector data defined relative to the workpiece coordinate system. This data is then sent through an object instance of the Generalized Kinematics Machine Library Cascade system as Type #3 data input as described in the '971 Application. The generalized kinematics library 2002 computes the machine axes positions and orientations to generate the tool position for each tool position in the tool path as disclosed in the '971 Application. The machine axes positions and other associated tool position data are returned to the calling process (e.g., a milling application or a simulation application). Graphical simulation data (e.g., part surface lines) are processed with an identical method.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method for controlling movement of a first machine tool system having defined kinematics including at least four movable axes to machine a part, the method comprising the steps of:

providing a conversational programming interface configured to receive user input defining, without reference to the defined kinematics, a geometry to be formed on the part such that the geometry as defined may be processed by any of a plurality of other machine tool systems having at least four movable axes, including one movable axis that is different from the at least four movable axes of the first machine tool system;

generating a first tool path relative to a current coordinate system for forming the geometry;

transforming the first tool path into a final tool path defined relative to a workpiece coordinate system, the workpiece coordinate system being a Cartesian coordinate system corresponding to an orientation and location of the part within the first machine tool system; and processing the final tool path to generate positions for the at least four movable axes based on the defined kinematics.

2. The method of claim 1, wherein the generating step includes the step of inverse mapping a cylindrical tool path to a tool path in a Cartesian coordinate system corresponding to the part.

3. The method of claim 1, wherein the processing step includes the step of accessing a generalized kinematics library including the defined kinematics.

4. The method of claim 1, wherein the first tool path is a cylindrical tool path.

5. The method of claim 1, wherein the user input defines the geometry in a Cartesian coordinate system corresponding to the current coordinate system.

6. The method of claim 1, wherein the user input defines the geometry in a cylindrical coordinate system.

7. The method of claim 1, wherein the generating step includes the step of mapping the geometry definition from a Cartesian coordinate system corresponding to the current coordinate system to a cylindrical coordinate system.

8. The method of claim 7, wherein the generating step further includes the step of applying a radial pattern of the geometry in a Z-direction of the Cartesian coordinate system corresponding to the current coordinate system.

9. The method of claim 7, wherein the generating step includes the step of applying a rotary mirror feature of the geometry in the Cartesian coordinate system corresponding to the current coordinate system.

10. The method of claim 7, wherein the generating step includes the step of applying a rotary pattern feature of the geometry in the cylindrical coordinate system.

11. The method of claim 1, wherein the final tool path includes a plurality of tool positions, each tool position including a tool tip location and a tool vector.

12. The method of claim 1, further including the steps of:
providing the generated positions to a real time mill application; and
machining the part with the real time mill application.

13. The method of claim 1, further including the step of graphically simulating the process of machining the part.

14. A method for controlling movement of machine tool systems, the method including the steps of:
providing a conversational programming interface that permits a user to create a program for execution by any of a plurality of machine tool systems for machining a part, each system having at least four movable axes and a corresponding axis kinematics configuration;
receiving, using the interface, a block of the program including a definition of a geometry of the part, the geometry requiring use of at least one of a rotary axis and a tilt axis and being defined without reference to any axis kinematics configuration;
generating a first tool path relative to a first Cartesian coordinate system for forming the geometry;
mapping the first tool path to a second Cartesian coordinate system corresponding to the part;
transforming the mapped tool path to a third Cartesian coordinate system corresponding to an orientation and a location of the part relative to an axis kinematics configuration of a current machine tool system; and
processing the transformed tool path to generate positions for the at least four movable axes of the current machine tool system based on the axis kinematics configuration of the current machine tool system.

15. The method of claim 14, wherein the processing step includes the step of accessing a generalized kinematics library including the axis kinematics configuration of the current machine tool system.

16. The method of claim 14, wherein the first tool path is a cylindrical tool path.

17. The method of claim 14, further including the steps of:
saving the program; and
executing the program on another of the plurality of machine tool systems.

18. The method of claim 14, wherein the interface includes a block definition screen including data fields for a first rotary axis and a second rotary axis.

19. The method of claim 14, wherein the part has a curved outer surface.

20. The method of claim 14, further including the step of receiving, via a rotary transform plane screen of the interface, a definition of a relationship between a current coordinate system and a new coordinate system, the rotary transform plane screen including a plurality of origin fields for receiving user input of a location of an origin of the new coordinate system and a plurality of angle fields for receiving user input of an angular orientation of the new coordinate system relative to the current coordinate system.

21. The method of claim 20, wherein the plurality of angle fields includes an R(X) field for receiving user input specifying a rotation about an X-axis of the current coordinate system, an R(Y) field for receiving user input specifying a rotation about a Y-axis of the current coordinate system after rotation about the X-axis, and an R(Z) field for receiving user input specifying a rotation about a Z-axis of the current coordinate system after rotation about the X- axis and the Y-axis.

22. The method of claim 20, wherein subsequent blocks in the program are processed with respect to the new coordinate system.

23. A non-transitory computer readable medium having stored thereon instructions for generating a conversational programming interface on a display to enable a user to create a part program for execution by any of a plurality of machine tool systems having at least four movable axes and a corresponding axis kinematics configuration;
instructions for receiving, using the interface, a block of the part program including a definition of a geometry of a part, the geometry requiring use of at least one of a rotary axis and a tilt axis and being defined without reference to any axis kinematics configuration;
instructions for generating a first tool path relative to a first Cartesian coordinate system for forming the geometry;
instructions for mapping the first tool path to a second Cartesian coordinate system corresponding to the part;

instructions for transforming the mapped tool path to a third Cartesian coordinate system corresponding to an orientation and a location of the part relative to an axis kinematics configuration of a current machine tool system; and instructions for processing the transformed tool path to generate positions for the at least four movable axes of the current machine tool system based on the axis kinematics configuration of the current machine tool system.

24. A first machine tool system for machining a part with at least one tool, the apparatus comprising:

a frame;

a moveable support supported by and moveable relative to the frame, the moveable support supporting the part;

a machine tool spindle supported by the frame and moveable relative to the part, the machine tool spindle adapted to couple the at least one tool, the moveable support and the machine tool spindle including at least four moveable axes and a corresponding axis kinematics configuration;

a controller operably coupled to the machine tool spindle and the moveable support, the controller executing the machining of the part through the controlled movement of the at least four moveable axes of the machine tool spindle and the moveable support;

means for generating a conversational programming interface on a display that permits a user to create a part program that defines a geometry of the part without reference to the axis kinematics configuration such that the geometry as defined may be processed by any of a plurality of other machine tool systems having at least four movable axes, including one movable axis that is different from the at least four movable axes of the machine tool spindle and the movable support;

means for generating a first tool path relative to a first Cartesian coordinate system for forming the geometry;

means for mapping the first tool path to a second Cartesian coordinate system corresponding to the part; and means for transforming the mapped tool path to a third Cartesian coordinate system corresponding to an orientation and a location of the part relative to the axis kinematics configuration;

wherein the controller processes the transformed tool path to generate positions for the at least four movable axes based on the axis kinematics configuration.

* * * * *